United States Patent
Küking

(10) Patent No.: US 11,675,074 B2
(45) Date of Patent: Jun. 13, 2023

(54) DEVICE FOR LOCATING OBJECTS IN AN ANIMAL HOUSE

(71) Applicant: BIG DUTCHMAN INTERNATIONAL GmgH, Vechta (DE)

(72) Inventor: Jörg Küking, Vechta (DE)

(73) Assignee: BIG DUTCHMAN INTERNATIONAL GMBH, Vechta (DE)

( * ) Notice: Subject to any disclaimer, the term of this patent is extended or adjusted under 35 U.S.C. 154(b) by 1197 days.

(21) Appl. No.: 16/153,887

(22) Filed: Oct. 8, 2018

(65) Prior Publication Data

US 2019/0107621 A1    Apr. 11, 2019

(30) Foreign Application Priority Data

Oct. 9, 2017    (DE) .......................... 202017106101.9

(51) Int. Cl.
| | |
|---|---|
| A01K 45/00 | (2006.01) |
| G01S 7/497 | (2006.01) |
| G01S 17/04 | (2020.01) |
| A01K 29/00 | (2006.01) |
| G01V 8/20 | (2006.01) |

(52) U.S. Cl.
CPC ............ *G01S 17/04* (2020.01); *A01K 29/005* (2013.01); *A01K 45/00* (2013.01); *G01S 7/497* (2013.01); *G01V 8/20* (2013.01)

(58) Field of Classification Search
CPC .................................................... G01S 7/497
See application file for complete search history.

(56) References Cited

U.S. PATENT DOCUMENTS

| | | | | |
|---|---|---|---|---|
| 4,448,150 A | * | 5/1984 | Catsimpoolas | ...... A01K 29/005 119/455 |
| 5,412,420 A | * | 5/1995 | Ellis | ....................... G01B 11/24 348/135 |

(Continued)

FOREIGN PATENT DOCUMENTS

| | | |
|---|---|---|
| DE | 28 10 891 | 9/1979 |
| DE | 10 2008 035888 | 3/2010 |

(Continued)

*Primary Examiner* — Isam A Alsomiri
*Assistant Examiner* — Sanjida Naser
(74) *Attorney, Agent, or Firm* — Price Heneveld LLP

(57) ABSTRACT

An animal surveillance device for detecting stationary objects in a poultry house comprises a noncontact scanner adapted to emit electromagnetic radiation in a scanner and to receive a reflection of the electromagnetic radiation and an electronic evaluation unit which is in signal communication with the scanner and adapted to evaluate the signals received from the scanner. The scanner includes at least one scanner unit comprising a transmitter for transmitting an electromagnetic scanning beam in a predetermined direction and a receiver for receiving a reflection of the scanning beam from the predetermined direction. The evaluation unit is configured to calculate a transit time signal from the reception of a reflected signal emitted from the scanner unit and from the transit time of the signal and to produce a transit time profile for the scanner unit from the transit time signal received over a period.

17 Claims, 3 Drawing Sheets

(56) References Cited

U.S. PATENT DOCUMENTS

| | | | | |
|---|---|---|---|---|
| 5,474,085 A | * | 12/1995 | Hurnik | A01K 11/006 |
| | | | | 600/587 |
| 2010/0246970 A1 | * | 9/2010 | Springer | A01K 11/006 |
| | | | | 382/195 |
| 2016/0363692 A1 | * | 12/2016 | Arpin | G01V 8/12 |
| 2017/0006837 A1 | * | 1/2017 | Balzani | G01B 11/002 |
| 2017/0184399 A1 | * | 6/2017 | Thayer | G01S 7/499 |
| 2017/0291575 A1 | * | 10/2017 | Le | G01B 7/026 |
| 2018/0281472 A1 | * | 10/2018 | Terradellas Callau | |
| | | | | B41J 11/007 |
| 2019/0307106 A1 | * | 10/2019 | Hartung | G05D 1/0272 |

FOREIGN PATENT DOCUMENTS

| | | |
|---|---|---|
| EP | 1 212 939 A1 | 6/2002 |
| EP | 1 736 801 A2 | 12/2006 |
| EP | 2260699 B1 | 12/2010 |
| EP | 2 698 763 A1 | 2/2014 |
| EP | 2786655 B1 | 10/2014 |
| JP | H11276011 | 10/1999 |
| WO | 99 09910 A1 | 3/1999 |
| WO | 2015/121431 A1 | 8/2015 |

* cited by examiner

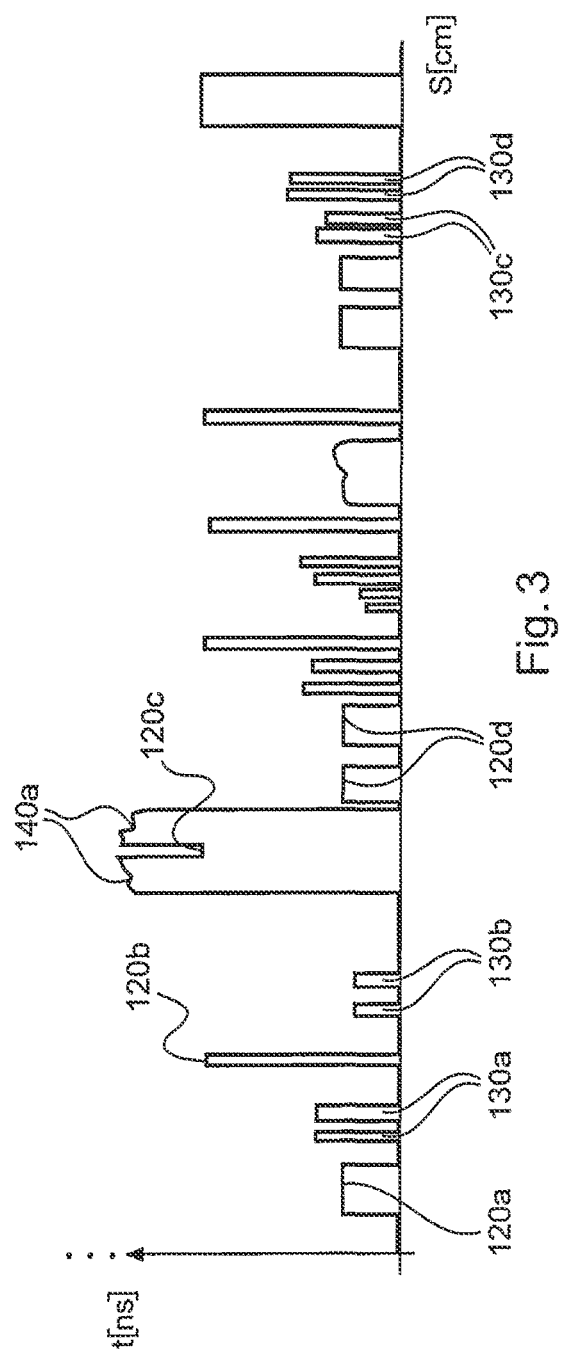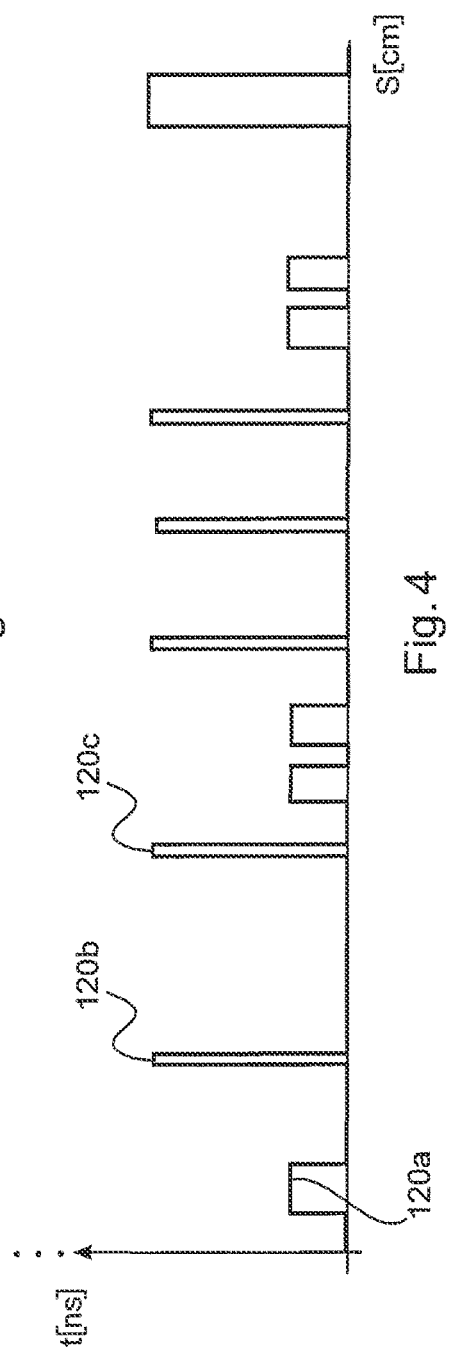

DEVICE FOR LOCATING OBJECTS IN AN ANIMAL HOUSE

CROSS REFERENCE TO FOREIGN PRIORITY DOCUMENT

The present application claims the benefit under 35 U.S.C. §§ 119(b), 119(e), 120, 121, 365(c), and/or 386(c) of German Application DE 202017106101.9 filed Oct. 9, 2017.

FIELD OF THE INVENTION

The present disclosure relates to an animal surveillance device for detecting stationary objects in a poultry house, comprising a noncontact scanner adapted to emit electromagnetic radiation in a scanner and to receive a reflection of the electromagnetic radiation, and an electronic evaluation unit which is in signal communication with the scanner and adapted to evaluate the signals received from the scanner.

BACKGROUND OF THE INVENTION

In present-day livestock farming, several animals are typically housed in a common animal housing unit, for example, when keeping laying hens, broilers, or poultry in general, in cages, percheries, or multi-tier aviaries. Many operations in this kind of livestock farming, for example, supplying feed and liquid, are automated and may also include measures to ensure hygiene, such as removal of droppings, and other measures, such as the collection of eggs.

For reasons of hygiene, it is desirable that objects which disrupt these automated procedures are removed before any hygiene problems ensue. What sometimes happens, for example, is that on a surface in a housing system where eggs can roll down and be collected, an object inadvertently lies at which eggs accumulate, or which causes damage to the eggs when they roll down. This may affect product quality and product freshness.

A system for monitoring a farm with the aid of cameras is known from EP 1 212 939 A1. The system works with a plurality of video cameras, the video signals from which are subjected to computerised analysis in order to derive the particular position of each animal.

Advanced prior art systems for monitoring livestock, which likewise allow the location of the animals and also their behaviour to be monitored safely and automatically by means of video camera surveillance, are known from EP 2260699 B1 and EP 2786655 B1.

These prior art systems based on continuous video surveillance are also capable in general of recognising animals in the area where the animals are kept, but they are not capable of economically monitoring livestock for unforeseen objects in many forms of livestock farming. One reason for this incapability is that the systems are based on overview monitoring, which, due to spatial conditions, cannot be guaranteed in many forms of livestock farming Another is that the components needed to implement prior art monitoring methods are too expensive and complicated in respect of investment costs and maintenance to allow economical and reliable monitoring of livestock for objects that are not supposed to be in the area where the animals are kept.

A device and method for detecting dead animals in a livestock building are known from WO 2015/121431 A1. The device uses a two-dimensional laser scanner that scans an angular range by means of a pivotable laser. When the laser beam is reflected by a body, the sensor laser calculates its angle and distance on the basis of the transit time, using the principle of sonar. According to this prior art, the laser scanner is used in such a way that mappings are obtained of two or more different points, and objects are detected on the basis of the laser radiation that is reflected. The mappings are performed with two-dimensional scanning means placed at the height of the farm animals' legs. When an animal is identified in the same position as in two successive periodic mappings, a signal indicating the presence of a motionless animal is generated, from which it is possible to conclude that the animal is dead. With such a two-dimensional laser scanning system, in principle, it is possible to detect dead animals in a livestock building in a different technical manner than with video-based systems. However, for fast and reliable detection of the dead animals, it is necessary to improve the system in order to monitor the animal efficiently and without imposing additional stress on the animals. When the stress on the animals is taken into consideration, it is only possible with such a system to ensure that dead animals are detected within approximately 24 hours.

Another problem of the prior art is that, according to WO 2015/121431 A1, the laser scanner is mounted on a feed trailer and is moved with this feed trailer horizontally along a multi-tier row of cages. This necessitates additional vertical movement of the laser scanner in order to scan the several tiers in the rows of cages. Due to this not only horizontal but also vertical movement, the farm animals in the cages are exposed to additional stress that is triggered by the feed trailer passing by several times and the expectation of food that this engenders, and by those expectations being disappointed. An arrangement in which a laser scanner is provided on each tier of the livestock building that can reduce the number of movements is needed, but the disadvantage is that it causes significant additional costs due to the laser scanners and analyser units that are then required.

Another problem has to do with the practicalities of locating an identified dead animal. WO 2015/121431 A1 describes in basic terms the advantage of detecting the location of an identified dead animal, but determining its location proves to be problematic as far as actual realisation is concerned. This is basically due to the fact that housing systems for farm animals are generally subject to individual planning and dimensioning and that any details of location need to be configured accordingly in order for them to be processed and derived, in order to allow a specified location to be adapted to the individual housing. Due to the ambient conditions, in many cases measured values essential for calculating the location are also spread over a longer period of use or are falsified, and for that reason cannot provide reliable details when the system is put to practical use over a longer period. Finally, calculating a location generally requires that the entire housing system be scanned with the laser scanner, and that the two-dimensional scan data are analysed from at least two positions. This makes it complicated—and stressful for the animals—to perform spot checks and to spatially map objects that are supposed to be subject to tighter monitoring, not only with regard to performing the scans, but also with regard to spatial mapping.

SUMMARY OF THE INVENTION

The object of the present disclosure is, therefore, to provide a system for detecting objects in an animal housing system, which detects such objects quickly and reliably in a practically useful and economical manner.

This object is achieved, according to the present disclosure, with a detection means of the kind initially described, in which the scanner includes at least one scanner unit comprising a transmitter for transmitting an electromagnetic scanning beam in a predetermined direction and a receiver for receiving a reflection of the scanning beam from said predetermined direction and that the evaluation unit is configured to calculate a transit time signal from the reception of a reflected signal emitted from the scanner unit and from the transit time of the signal and to produce a transit time profile for the scanner unit from the transit time signal received over a period.

According to the present disclosure, the scanner unit is designed to transmit an electromagnetic scanning beam in a predetermined direction and to receive a reflection of that scanning beam from the predetermined direction. The scanning unit thus comprises a transmitter and a receiver for the electromagnetic radiation and which are designed in such a way that they perform measurement in the predetermined direction. Unlike in the prior art, the device according to the present disclosure is not used to scan an angular range from one measurement point, i.e., to scan in several directions, but rather to scan in exactly one predetermined direction. This scanning in one direction interacts functionally with a traversing movement of the scanner unit, which traversing movement can be moved along the area to be examined at the scanning level for the respective detection period, in order to move the scanner unit with its fixed, one-dimensional scanner during a constant movement. In this way, it is possible for a transit time profile to be generated for the scanner unit from the transit time signals received during the period of motion. The result obtained from the detection means deployed in this way is then a transit time profile from the scanner unit, which maps the respective transit times detected as measurement points or as a measured curve as a function of time or against the path of travel.

On the basis of such a transit time profile, it is possible to read the distance from the scanner unit of any object identified by reflection, which has been detected by the moving electromagnetic beam and which has reflected the radiation. On the basis of such a transit time profile, any object in the area where the animals are kept can be promptly identified and its distance calculated. In addition to the basic possibility of determining the position of such objects in absolute terms, this can also be done in relative terms, i.e., on a comparative basis. In this case, the transit time profile is compared with a calibration profile obtained from the animal housing area in a state in which no objects or foreign matter were in said area. This calibration profile is obtained by scanning with the scanner unit when the animal housing system is empty. It then serves as a reference for detecting any additional objects by making comparisons.

The device according to the present disclosure can also be used to detect changes occurring over time while the animal housing system is being used. For example, if one and the same area is scanned twice with a time interval between scans, for example, by the scanner unit being moved along a measuring distance at a first time and then at a second time after an interval, with a respective transit time profile being recorded each time, it is possible to determine whether or not the objects detected by scanning have moved between the first and second measurement, and if objects which have not moved are detected, the conclusion can be drawn that an immovable object has been detected, i.e., an object that was not expected. It is also advantageous that one-dimensional measurement along the scanning direction in combination with a traversing movement allows the geometrical dimensions of an object in the traversing direction to be measured directly in association with the traversing movement. It is, therefore, possible with the detection means according to the present disclosure, to perform economically efficient checks on animal housing systems in a reliable manner and to perform accurate and safe checks under dusty and dirty conditions, and to detect any undesired objects that are in the cage and which obstruct the eggs rolling down and preventing the collection of the eggs, and to allow such objects to be promptly removed before delays occur in the collection of the eggs.

Surprisingly, the device according to the present disclosure is also capable of detecting a sick or dead animal in the area where the animals are kept. Unlike the teaching of the prior art, it is not necessary to carry out complicated two-dimensional scanning in order to recognise the contours of animals. Instead, by scanning in a predetermined direction in accordance with the present disclosure, it is also possible to detect whether a sick or dead animal is on the ground—for example, by detecting that animal on the basis of a comparison with a calibration profile or by comparing two scans performed with an interval between them. In this way, sick or dead animals in the area where the animals are kept can be detected at an early stage so that they can be removed from that area before the other farm animals are put at risk.

In this regard, the scanner includes at least two vertically spaced-apart scanning units, each of said scanning units comprising a transmitter for transmitting an electromagnetic scanning beam in a predetermined direction and a receiver for receiving a reflection of the scanning beam from said predetermined direction and that the evaluation unit is configured to calculate a transit time signal from the reception of a reflected signal emitted from the scanner unit and from the transit time of the signal and to produce a transit time profile for each of the scanning units from the transit time signals received over a period.

According to the present disclosure, at least two scanning units that are part of the scanner are provided. The two scanning units are vertically spaced apart from each other and are thus arranged to perform measurements at different heights in the direction of gravity. This arrangement allows at least two tiers in which farm animals are kept to be scanned in one detection process using the scanner according to the present disclosure, so that checks for sick or dead animals can be carried out. This obviates the need for multiple runs, with a scanner unit being moved vertically after a first pass in order to perform a second scan in a second pass.

The scanning in exactly one direction, as described above, can cooperate functionally with the two or more scanning units provided, which can be moved in a common movement along the area to be examined, on the two levels for the respective detection period, in order to move the scanner units with their fixed, one-dimensional scanners during a constant movement. In this way, it is possible to create a transit time profile for each of the two scanning units, and for any other scanning units provided, from the transit time signals received during the period of movement. This allows detection to be carried out in a way that is less stressful for the farm animals. The output from the detection means used in this manner is then a first transit time profile from the one scanner unit, which plots each of measured transit times as measurement points or as a measuring curve over time, for example, or over the path of travel, and a second transit time which plots the transit time signals received from the second scanner unit over time or over the path of travel. The stress imposed on the individual animals in the population being kept in the animal housing facility as a result of the detection process is thus minimised, and the period needed for reliable detection of a sick or dead animal can be shortened in comparison with the prior art without the animals being subjected to additional stress.

According to a first embodiment of the present disclosure, the evaluation unit includes an electronic transit time profile memory and is further configured to store in the transit time profile memory at least one predetermined transit time profile pattern and a location associated with said predetermined transit time profile pattern, to produce, from a plurality of transit time signals detected over a scanning period, a transit time profile representing the transit time signals during said scanning period, to compare at least one section of the transit time profile with the predetermined transit time profile pattern stored in the transit time profile memory, and to associate, when the at least one section of the transit time profile is found to match the transit time profile pattern, the location stored in the transit time profile memory in respect of the predetermined transit time profile pattern with said section of the transit time profile.

It should be understood that this development of the present disclosure can also be carried out independently of the previously described present disclosure with the detection means of the kind initially described. This aspect of the present disclosure provides a simple yet particularly reliable way of calculating a precise location for a specific object detected in the transit time profile, such as. for example, a sick or dead animal. The principle of the present disclosure is based on the fact that, in typical applications, when monitoring a barn area, it is not only animals or body parts of animals that are scanned when recording transit time signals and creating a transit time profile from those signals, but also stationary fixtures and frame members of the barn facility that are sensed. These stationary elements produce a typical and recurrent pattern in the transit time profile for each measurement and are used in accordance with the invention to determine a location. By comparing the transit time signals obtained from these stationary elements, a specific transit time signal indicating an animal, within the transit time profile, can be associated with a precise location. According to the present disclosure, this is achieved in practical terms by basing comparison on a transit time profile pattern which shows these stationary elements, and by comparing all or parts of the respective transmit time profile obtained in a measurement operation with said transit time profile pattern. By recognising and associating those transit time signals in the transit time profile representing the stationary elements shown in the transit time profile pattern, it is possible to assign a location reliably and precisely.

This aspect and this development of the present disclosure avoids the problem that arises when using displacement sensors or distance measurement devices, or location data derived from motor rotations, when these are used in dusty and dirty environments and inaccuracies and corruption of measured values occur as a result of dust and dirt, slippages, blockages, or irregular movements, which make the location data imprecise and unreliable. According to this aspect and this development of the present disclosure, instead of such additional components and steps for determining locations, which cause further costs, use is made of the actual measurement data, and the location is determined reliably on the basis of a comparison of those data with reference data indicating the stationary elements in the barn facility. The development and configuration of this aspect of the present disclosure is unrestrictedly capable of conducting an overall survey with clear assignments of location, and can also be used just as precisely and with fast, simple evaluation to examine and check just one section and to assign a location, or to assign a location to a particular structure within such a section, with the relevant details of that location.

In this development and this aspect of the present disclosure, a transit time profile pattern is understood, for example, to be a diagram showing measurement points or a measurement curve, in which the transit time signals are plotted over time, over the path of travel, just like in a transit time profile. Transit time profile patterns and transit time profiles can thus be compared directly with each other and preferably have axes with the same units and scales. In this way, a direct comparison can be carried out for the transit time signals plotted on the Y-axis, and stationary components of the barn facility can be identified immediately in the transit time profile and used as reference points for specifying a location.

A comparison of at least one section of the transit time profile with the predetermined transit time profile pattern stored in the transit time profile memory is to be understood here to mean that one, two, or more sections, or indeed the entire transit time profile is compared accordingly with one, two, or more sections of the transit time profile pattern or with the entire transit time profile pattern. It is also possible, in particular, to compare one or more sections of the transit time profile with the entire transit time profile pattern in order to identify the corresponding sections or the one corresponding section therein.

The aforementioned development or the aforementioned aspect of the present disclosure can be further developed by configuring the evaluation unit to compare, when comparing at least one section of the transit time profile with the predetermined transit time profile pattern stored in the transit time profile memory, a first transit time profile section, a second transit time profile section, and a distance defining a spatial distance between the first transit time profile section and the second transit time profile section, with a first section of the transit time profile pattern, a second section of the transit time profile pattern and a predetermined distance defining a distance between the first second of the transit time profile pattern and the second section of the transit time profile pattern, and to associate the location stored in the transit time profile memory in respect of the predetermined transit time profile pattern with the transit time profile when the first transit time profile section is found to match the first section of the transit time profile pattern and the second transit time profile section is found to match the second section of the transit time profile pattern and the distance is found to match the predetermined distance.

With this development of the present disclosure, the evaluation unit is configured in such a way that it performs the comparison on the basis of two stored transit time profile sections and an interval that is between those transit time profile sections and that is likewise stored. This way of comparing provides a particularly reliable and accurate way of localising a transit time profile or a point in a transit time profile. If two transit time profile sections matching the respective sections of the transit time profile pattern are found in the transit time profile and are arranged the same distance from each other as in the section of the transit time profile pattern, then a respective location can be assigned unambiguously, and with that location as a point of reference, it is possible by calculating the respective distances apart, to assign a specific location in the monitored animal housing facility to every location or measurement point in the transit time profile.

According to another development, the evaluation unit is configured to record, in a calibration mode, a first transit time profile and to store the first transit time profile as a transit time profile pattern in the transit time profile memory, and to record, in a surveillance mode, a second transit time profile and then any further transit time profiles, if necessary, and to compare said second and each further transit time profile with the transit time profile pattern.

According to this embodiment, a measurement is firstly performed in a calibration mode, by passing the scanner over the section of the animal housing facility to be monitored and calculating a transit time profile. This transit time profile may cover the entire measuring track or may cover individual sections or one single section of that measuring track. The transit time profile is then stored as a transit time profile pattern and is subsequently used as a reference for comparing other transit time profiles that are recorded. In particular, the transit time profile can be recorded in calibration mode when the animal housing facility is not occupied by animals, so that only the stationary fixtures of the barn facility are recorded in the transit time profile.

The device according to the present disclosure is developed by a traversing device for moving the scanner along an animal housing facility in a traversing direction that is transverse to, in particular, perpendicular to the scanner. Such a traversing device allows the scanner to be moved along a curve or a straight line or some other path past the animals to be monitored. The traversing direction is preferably transverse, in particular, to the scanner, so that new areas can always be scanned with the electromagnetic radiation during continuous traversing movement and so that the scanning motion necessary for a spatial scan is provided by the traversing movement. When the scanner is typically moved along a straight path, the result is a plurality of parallel scanners arranged parallel to each other, and from which a transit time profile is produced. The transit time profile can typically show the traversing movement on the X-axis and the respective transit time signal on the Y-axis, thus allowing direct conclusions to be drawn about the animals and objects detected by scanning.

It should be understood, as a basic principle, that the traversing device can move all the essential components of a detection means according to the present disclosure, in particular, in such a way that the scanner with all the scanning units and the evaluation unit, as well as a separate power supply for them, are moved and that it, therefore, constitutes an independent, autarchic detection means. The traversing device may be arranged, in particular, at a piece of barn equipment serving some other purpose, for example, a feeding apparatus, a cleaning unit, or the like, such that a traversing device that is present anyhow, and the necessity of its being in operation anyhow, are also utilised for monitoring the animal population by means of the detection means according to the present disclosure.

According to yet another embodiment, the evaluation unit is configured to record a transit time profile during continuous movement of the scanner along the animal housing facility, wherein the animal housing facility preferably has a plurality of distinct housing units separated from each other, and the evaluation unit is configured to record, in a single transit time profile, during the traversing movement, the plurality of distinct housing units separated from each other and to compare said transit time profile with a transit time profile pattern stored for the plurality of distinct housing units separated from each other. According to this embodiment, monitoring by means of the scanner is carried out during continuous movement of the scanner. This movement can preferably be along a plurality of separate housing units, for example, individual barns, aviaries, or barn units. The transit time signals detected in the process are mapped in a transit time profile by the evaluation unit and analysed by the evaluation unit. This embodiment allows monitoring to be carried out in a way that does not stress the animals, because continuous movement avoids the animals being disturbed by continual stopping and starting. It also allows efficient analysis, in that a single transit time profile for a row of cages or housing units is produced and analysed. This makes it easier, in particular, to determine a location precisely in order to localise an animal that has been identified, for example, with reference to a transit time profile pattern. This development of the present disclosure makes use of the fact that most of the housing units being monitored and recorded in one pass are stationary in relation to each other and for that reason it is possible to specify a location reliably with reference to a single section of a transit time profile that matches a transit time profile pattern.

A neighbouring scanner unit is arranged flush with a scanner unit in respect of the traversing direction and spaced a distance apart from it in the traversing direction, wherein the evaluation unit is configured to calculate a neighbouring transit time signal from the reception of a signal emitted from the neighbouring scanner unit and its transit time, the scanner unit and the neighbouring scanner unit with the evaluation unit are configured and interconnected for simultaneous recording of a transit time profile from the transit time signal and of a neighbouring transit time profile from the neighbouring transit time signal, and the evaluation unit is configured to compare the transit time profile and the neighbouring transit time profile with each other, taking the spacing and a traversing speed into account, and to evaluate as sign-of-life signals any transit time signals for which no match can be found in the transit time profile and the neighbouring transit time profile.

According to this embodiment, two scanning units are provided, namely the scanner unit and the neighbouring scanner unit, which are arranged in such a way relative to each other that they have scanners flush with each other in the traversing direction and, therefore, scan areas which are offset from each other but match each other during the traversing movement. The scanners of the scanner unit and the neighbouring scanner unit are, therefore, arranged at the same height, which means that they are offset from each other in the horizontal plane only when a horizontally oriented traversing movement occurs during measurement. The two scanning units, therefore, produce matching transit time profile patterns that are offset merely in the horizontal plane, and which can be made to match by the evaluation unit for comparison purposes by performing an arithmetic offset. The scanner unit and the neighbouring scanner unit perform the measurement simultaneously, such that a specific place inside the animal housing facility is firstly scanned by one of the two scanning units and then by the other one of the two scanning units, after a respective time interval resulting from the distance between the scanner unit and the neighbouring scanner unit and the traversing speed.

This special arrangement and development makes it possible to obtain, in a single measurement operation, what is often a reliable indication of moving and motionless animals. In particular, animals are prompted by the traversing movement of the scanner to make a movement of their own, because this traversing movement awakens the animals' interest or because a release of feed triggers expectations when the traversing movement occurs at a feed dispenser. Sick or dead animals can thus be identified directly, as they produce matching transit time signals in the transit time profile of the scanner unit and the transit time profile of the neighbouring scanner unit if they are stationary and motionless in the animal housing facility. This development, therefore, allows such sick or dead animals to be detected quickly.

The neighbouring scanner unit transmits and receives in a neighbouring scanner that moves non-parallel to the scanner of the scanner unit and that lies in a level plane with the scanner and the traversing direction, wherein the neighbouring scanner is preferably oriented in such a way that, in a reference plane that is perpendicular to the traversing direction, it is at an angle to the vertical that is the same as the angle at which the scanner is to the vertical in said reference plane, and in that the evaluation unit is configured to compare the transit time profile and the neighbouring transit time profile with each other on the basis of the transit time signal, the neighbouring transit time signal, the spacing between the scanner unit and the neighbouring scanner unit, and the angle between the scanner and the neighbouring scanner, taking the spacing and the traversing speed into account, and to evaluate as sign-of-life signals any transit time signals for which no match can be found in the transit time profile and the neighbouring transit time profile. According to this development of the variant with a scanner unit and a neighbouring scanner unit, the scanners of the scanner unit and the neighbouring scanner unit do not run parallel to each other, but at an angle to each other. The two scanners define a plane of measurement in which the two scanners lie and which is typically horizontal or slightly inclined at a small angle to the horizontal and in which the traversing direction likewise lies. Due to the scanner of the scanner unit and the scanner of the neighbouring scanner unit being oriented at an angle to each other, it is possible to compensate for shadowing caused by objects being occluded by objects in between and as a result for the entire area where animals are kept to be scanned better on the whole. In order to associate the transit time signals obtained with the scanner unit and the transit time signals obtained with the neighbouring scanner unit with a matching object being scanned in this manner, the evaluation unit is configured to perform its analysis on the basis of the geometrical relationships, meaning the distance between the scanner unit and the neighbouring scanner unit, the angular orientation of the two scanners, and the respective transit time signal, and in doing so to determine whether a matching object has been detected with the scanner unit and the neighbouring scanner unit. This makes it possible to prevent shadowing, while simultaneously detecting unmoved object quickly in a single measurement operation.

The preferred electromagnetic radiation is laser radiation. By using laser radiation as the electromagnetic radiation, a reliable and clearly directed form of radiation in exactly one direction is used to perform the scanning. The laser radiation may be in a visible or invisible range, which can refer to visibility for the human eye and also to visibility in relation to the visual sensitivity of an animal being kept in the animal housing facility.

The electromagnetic radiation preferably has a wavelength in a range which is not visible to a hen. Selecting such a wavelength range reduces the extent to which the hens being kept in the animal housing facility are disturbed by the monitoring process, and avoids the risk of adverse effects on their visual sensitivity.

Each scanner unit preferably emits a one-dimensional electromagnetic beam with a constant angular orientation. Configuring the scanner unit in this way is cost-efficient, robust, and reliable, and allows the aforementioned embodiments with a plurality of vertically stacked scanner units and, where relevant, with neighbouring scanner units for each scanner unit to be provided with an economical investment and with economical maintenance expense, as well as a volume of data to be processed quickly and reliably by the evaluation unit.

Each scanner unit preferably emits a pulsed electromagnetic beam. By emitting pulsed electromagnetic beams, in other words radiation that is interrupted regularly or irregularly, it is possible to measure the transit times reliably and in this way to simplify analysis. Besides pulsed radiation, other modulation methods are also conceivable, for example, frequency or amplitude modulation, in order to measure transit times with constantly emitted radiation.

According to another preferred embodiment, the detection means according to the present disclosure may be developed by providing a contactlessly measuring temperature sensor arranged for temperature measurement along the scanner and adjacent to or coaxially with the scanner. Such a temperature sensor allows an additional measurement parameter to be detected, in addition to detecting the location and deriving movement from such detection of location. The body temperature of a detected animal can be measured directly as an absolute value by means of the temperature sensor, and on the basis of that body temperature it is possible to conclude that an animal is sick or dead. The conclusion that the animal is sick or dead may be purely based on the absolute temperature that is measured, or on a comparison of two temperatures measured at intervals by the temperature sensor for one and the same object. An object is identified as one and the same object on the basis of the scanning and localisation of the object, so a distinction can be reliably made with the temperature sensor between a resting animal and a dead animal, for example, when the animal is detected at one and the same place in a shorter time interval. It is also possible with the aid of the temperature sensor to distinguish between further objects that have been added, such as resting animals, laid eggs, or accumulations of droppings, because such objects have a different temperature and/or a different rate of temperature change than an animal.

It is particularly preferred in this regard that the temperature sensor is in signal communication with the evaluation unit, and the evaluation unit is configured to associate with one another a signal detected by the scanner and a signal detected simultaneously by the temperature sensor. This special linkage between the transit time signals and the temperature measurement signals makes it possible to associate data obtained from an object during one measurement run, thus allowing a good comparison to be made between two measurement runs and to analyse a single measurement run directly on the basis of the transit time profile obtained thereby and the temperature associated with the objects that can be identified in the transit time profile, thus allowing details of sick and dead animals to be obtained directly, for example, by identifying an animal that is not standing on its legs and which has a lower body temperature compared to the normal temperature as a dead animal.

It is still further preferred that the evaluation unit includes a counting means and is configured to store in the counting means the number of structures detected at regular time intervals and/or at regular spatial intervals by the scanner. By means of this development of the present disclosure, structures arranged in a regular manner, such as vertical struts in the poultry house or other equipment components, can be detected and the number of them counted and stored on a continuous basis. On the basis of the number of such structures counted by a particular scanning position or at a specific scanning time, the evaluation unit is able to determine the location directly, such that the spatial position of a disruptive object or dead object detected in the housing facility can be determined and associated directly from that number of structures. The evaluation unit can thus identify the vertical struts of a poultry house as structures that are detected during a scanning run, i.e., as recurrent structures, and can count them, so that an exact conclusion can be drawn about the spatial position of an undesired object or of a dead animal on the basis of the number of vertical struts counted as far as the undesired object or dead animal.

According to another preferred embodiment, the evaluation unit is configured to calculate a position of the scanner along a traversing path and to associate that position with the transit time profile, on the basis of the regular time interval measured by the counting means and/or the regular spatial interval measured by the counting means between the structures detected by the scanner. According to this embodiment, the counter is used to determine the position of scanner precisely and to associate that position with the transit time profile. It should be understood in this regard that, before measuring a transit time profile in a barn occupied by animals, it is advantageous to perform a calibration run, which allows recurrent structures such as vertical struts or other fixtures to be identified with reference to the unoccupied barn.

Determining a specific position on the basis of the recurrent structures that have been identified can be done in such a way that a position is specified to the user by the evaluation unit in terms of a previous and a subsequent recurrent structure along the path of the scanner, for example, by stating that the position determined is between the fifth and the sixth recurrent structure (vertical strut) along the path of the scanner unit.

The stated position can be made more precise by configuring the evaluation to interpolate between two recurrent structures on the basis of the elapsed travel time of the scanner while moving along its path, and calculating the exact position of the scanner in the area between those two recurrent structures on the basis of that interpolation. For example, if a period X elapsed between the detection of two successive recurrent structures, and a specific position has been reached after a period lasting 80% of X since detecting the first recurrent structure and, where relevant as a way of checking, the subsequent recurrent structure was also reached after a further 20% of the travel time from said position, then the conclusion can be drawn that the position being sought is at 80% of the total distance between the two recurrent structures after the first recurrent structure and, accordingly, 20% of the total distance before the second recurrent structure. In this way, the evaluation unit may be configured, on the basis of the time that elapsed between the detection of two successive recurrent structures, to specify a precise position between the two recurrent structures and thus to make it easier to locate a structure being sought which is recognised in the transit time profile.

The animal surveillance device is preferably developed by a sensor, coupled to a transmission element driven by a drive unit, or to a passively driven transmission element, in particular a drive wheel or a friction wheel, for measuring the distance travelled by the transmission element, wherein the evaluation unit is in signal communication with the sensor and configured to determine, from a distance signal received from the sensor, a position of the scanner along a path of travel and to associate that position with the transit time profile. According to this embodiment, a sensor is provided which measures the distance that the scanner has travelled, for example, an odometer, an incremental encoder, or a rotary position sensor. This sensor may be mechanically coupled directly to a wheel that is used to drive the scanner along a path to be measured. However, the sensor may also be coupled to a passively rolling wheel, for example, a friction wheel, which rolls on a structure extending longitudinally along the path of travel. In both cases, the path travelled can be measured on the basis of the sensor signals and the measurement can be combined with the transit time profile to enable a user to find a specified position for a point being sought in the transit time profile.

It should be understood that this development of the present disclosure, with a sensor for determining a position, may also be combined, in particular, with a way of determining a position according to any one of the developments described in the foregoing. More particularly, this sensor-based way of determining a position can be combined with a way of determining a position based on recurrent structures being detected by the scanner itself, in order to verify a specified position. In that respect, the evaluation unit may be configured to combine these two different ways of determining a position and to generate a specified position or range of positions. Besides these ways of determining a position, other devices for determining a position may be provided, either additionally or alternatively, in order to associate a position to a structure being sought within the transit time profile and to make it easier for the user to find the structure. For example, the scanner itself may be configured so that, at regular or irregular intervals, it performs a scan in the traversing direction, which can be backwards or forwards. Based on this scan in the traversing direction, which may be aimed at a particular reflecting structure at the beginning or at the end of the path of travel of the scanner, and which is reflected by that structure, it is then possible to determine a position along the path of travel and to associate it with the time or the signal value in the transit time profile recorded shortly before or shortly after that scan in the traversing direction. By scanning repeatedly in the traversing direction, it is possible to associate several positions along the path of travel to specific times in the transit time profile and in this way to determine the positions of sought structures within the transit time profile. In this case it is also possible, by interpolating between two positionings, on the basis of this scanning in the traversing direction, to determine by means of the evaluation unit an exact position for each point along the transit time profile.

It should be understood, as a basic principle, that on the basis of these positionings, which are carried out by detecting recurrent structures, by means of a separate sensor or by repeated scanning in the traversing direction, the transit time profile is translated into a locational profile, such that the evaluation unit associates the individual transit time signals recorded along the path of travel with a localisation point instead of with a point in time that the signal is recorded, with said localisation point characterising the position along the path of travel at which the transit time signal was recorded. Translating the transit time profile into a locational profile makes it simple to utilise a specific structure quickly and reliable that can be identified on the basis of the transit time signals.

BRIEF DESCRIPTION OF THE DRAWINGS

A preferred embodiment of the invention shall now be described with reference to the attached Figures, in which:

FIG. 3 is a transit time profile; and

FIG. 4 is a transit time profile pattern.

DETAILED DESCRIPTION OF THE PREFERRED EMBODIMENTS

Figure 1:
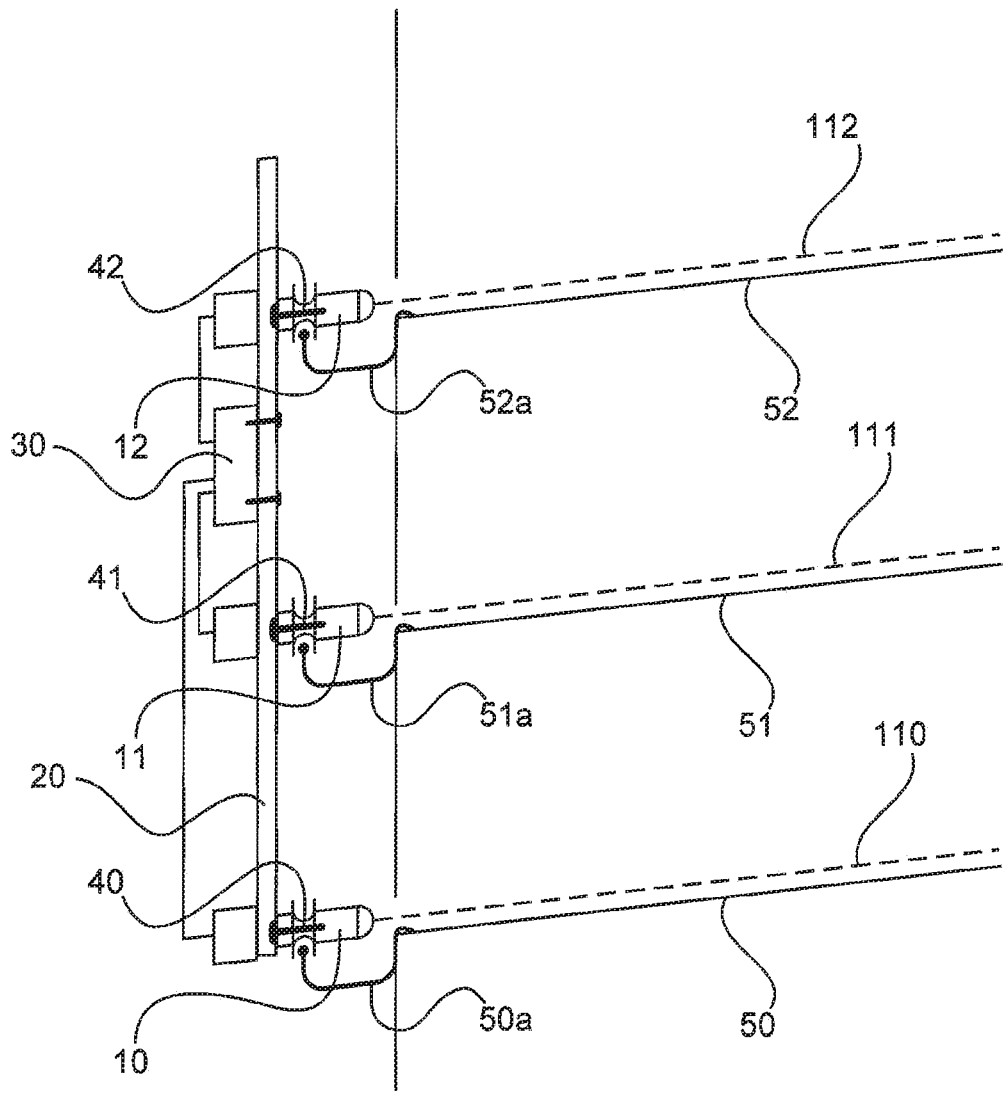
FIG. 1 is a schematic longitudinal view of a detection means according to the invention in use at a three-tiered animal housing facility for hens.

As can be seen from FIG. 1, the detection means according to the present disclosure is fitted with a scanner comprising three scanning units 10, 11, 12 spaced vertically apart from each other. Scanning units 10, 11, 12 are attached to a frame 20 on which an evaluation unit 30 is also arranged, with which scanning units 10, 11, 12 are in signal communication.

Frame 20 is movably mounted by means of three rollers 40, 41, 42 on egg collection chutes 50a, 51a, 52a of the cage facility and can thus be moved in a traversing direction A along the cages.

Each of the scanning units 10, 11, 12 emits a laser beam 110, 111, 112, which travels a short distance above a floor standing area 50, 51, 52 of the cage.

Scanning is preferably performed in a plane above the standing area of the animals, which is preferably spaced 0.5 to 10 cm, preferably 1 to 5 cm, from the standing area. The spacing is to be chosen such that scanning is performed at the height of the animals' legs. This ensures differential scanning and detection of the animals and objects.

Figure 2:
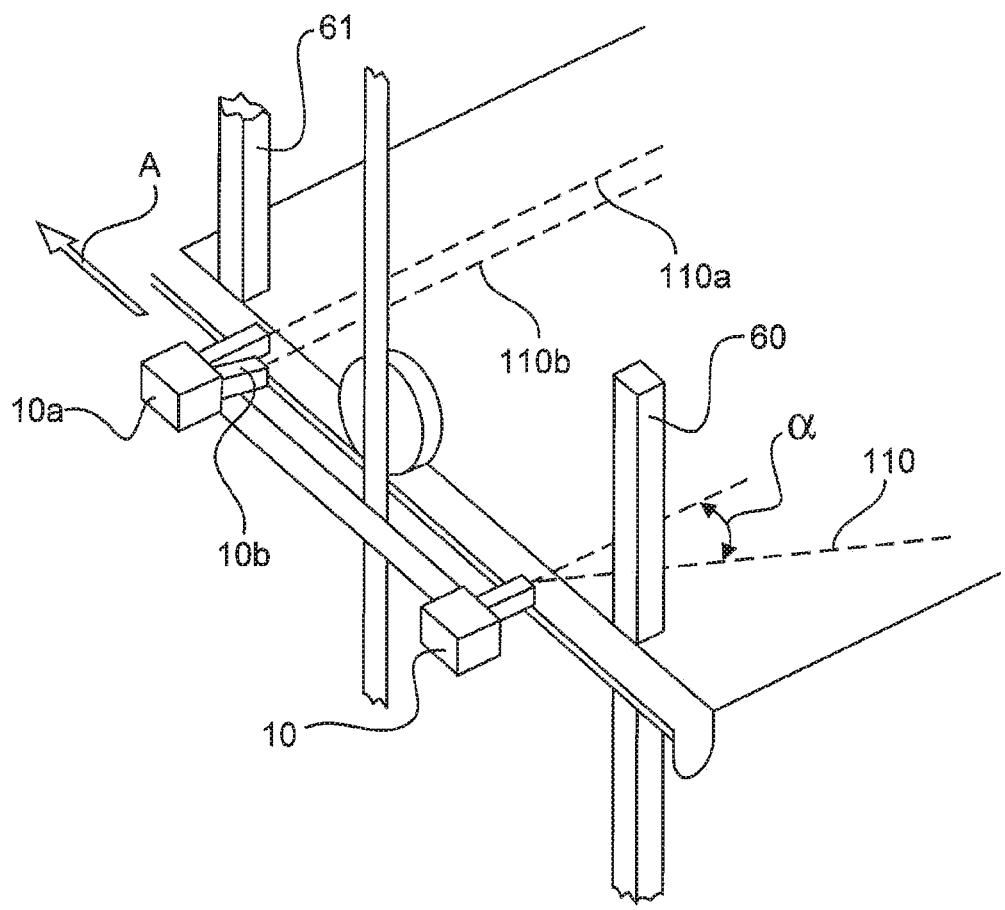
FIG. 2 is a section from FIG. 1, illustrating the measuring arrangement in a perspective arrangement.

Horizontally spaced apart from each other in traversing direction A, a neighbouring scanner unit is associated with each scanner unit, as can be seen from scanner unit 10 and the neighbouring scanner unit 10a in FIG. 2. The scanner unit 10 and the neighbouring scanner unit 10a both measure with a laser beam that travels parallel to a floor surface and a short distance above it. However, the laser measurement beam 110 of the scanner unit 10 is at an angle $\alpha$ to the laser beam 110a of the neighbouring scanner unit 10a, so that shadows resulting from objects being occluded by other objects between the scanner unit and the object behind the latter objects can be prevented, so that all the objects in the area above the floor surface are detected by at least one of the two laser beams 110, 110a.

A contactless measuring temperature sensor 10b is assigned and directly attached to neighbouring scanner unit 10a and emits a temperature measurement beam 110b that travels parallel to laser measurement beam 110a.

FIG. 3 shows a typical transit time profile for a measurement carried out with a scanner unit. The X-axis shows the path of travel along the egg collection chute, and the Y-axis shows the transit time signal detected with laser measurement beam 110 at the respective location along the egg collection chute. FIG. 4 shows a respective transit time profile pattern recorded during a calibration run during which there were no animals in the animal housing facility. As can be seen well by comparing FIGS. 3 and 4, recurrent transit time signals 120a, 120b, 120c, 120d must be directly associated with a stationary element in the barn facility, such as vertical struts 60, 61, drinking devices, or the like. On the basis of the pattern of the transit time signals distributed in this way in the transit time profile pattern, and the transit time signals in the transit time profile to be associated with them, it is possible to calculate a reliable location for each transit time signal that is additionally found in the transit time profile.

Typical transit time signals 130a, 130b, 130c, 130d can then be found in addition in the transit time profile and are detected for legs of standing hens. These signals are narrow peaks in the transit time signal and are caused by the laser beam being reflected by those legs.

A wide object or a hen lying on floor area 50 can be identified by a wide peak 140a that can be seen in the transit time profile. If such a wide peak 140a in the transit time profile is repeatedly identified at exactly the same location, the conclusion to be drawn is that there is a stationary object or a dead or sick hen that has not moved between the two measurements.

In addition to the possibility of identifying such a stationary object disturbing the eggs as they roll down, or a suspected sick or dead animal, by two transit time profile measurements spaced apart in time, with no change in spatial arrangement, it is also possible to conclude, from a broad peak detected once only in the transit time profile and indicating there is an object or animal lying on the ground, in conjunction with a temperature measurement indicating a temperature of the object that is atypical for a living hen, or indicating a lowered body temperature of the animal, that there is a stationary object or a sick or supposedly dead animal.

The invention claimed is:

1. An animal surveillance device for detecting stationary objects in an animal housing facility having a plurality of structures, comprising:

a noncontact scanner adapted to emit electromagnetic radiation and to receive a reflection of the electromagnetic radiation, the scanner including at least one scanner unit comprising a transmitter for transmitting an electromagnetic scanning beam in a predetermined direction and a receiver for receiving a reflection of the scanning beam from the predetermined direction, such that the scanner is adapted to move along a row of cages or housing units and produces and analyses a single transit time profile for the row of cages or housing units to determine a location precisely to localise an animal that has been identified; and an electronic evaluation unit in signal communication with the scanner and adapted to evaluate signals received from the scanner;

wherein the evaluation unit is configured to:

calculate a transit time signal from a reflected signal emitted from the scanner unit and from a transit time of the transit time signal and to produce a transit time profile for the scanner unit from the transit time signal received over a period;

record, in a calibration mode, a first transit time profile and to store the first transit time profile as a transit time profile pattern in a transit time profile memory; and record, in a surveillance mode, a second transit time profile and then any further transit time profiles, and to compare the second transit time profile and each further transit time profile with the transit time profile pattern; and wherein the evaluation unit includes a counting means and is configured to store in the counting means the number of the plurality of structures detected at regular time intervals and/or at regular spatial intervals by the scanner; and wherein the evaluation unit is configured to determine the position of the scanner on the basis of the pattern of the transit time signals distributed in the transit time profile pattern.

2. The animal surveillance device according to claim 1, wherein the scanner includes at least two vertically spaced-apart scanning units, each of the scanning units comprising:

a transmitter for transmitting an electromagnetic scanning beam in a predetermined direction; and a receiver for receiving a reflection of the scanning beam from said predetermined direction;

wherein the evaluation unit is configured to calculate a transit time signal from a reflected signal emitted from the scanner unit and from the transit time of the transit time signal and to produce a transit time profile for each of the scanning units from the transit time signals received over a period.

3. The animal surveillance device according to claim 1, wherein the evaluation unit includes an electronic transit time profile memory, and the animal surveillance device is further configured to:

store in the transit time profile memory at least one predetermined transit time profile pattern and a location associated with the predetermined transit time profile pattern;

produce, from a plurality of transit time signals detected over a scanning period, a transit time profile representing the transit time signals during the scanning period;

compare at least one section of the transit time profile with the predetermined transit time profile pattern stored in the transit time profile memory; and associate, when the at least one section of the transit time profile is found to match the transit time profile pattern, the location stored in the transit time profile memory in respect of the predetermined transit time profile pattern with the at least one section of the transit time profile.

4. The animal surveillance device according to claim 3, wherein the evaluation unit is configured to:

compare, when comparing the at least one section of the transit time profile with the predetermined transit time profile pattern stored in the transit time profile memory, a first transit time profile section, a second transit time profile section, and a distance defining a spatial distance between the first transit time profile section and the second transit time profile section with a first section of the transit time profile pattern, a second section of the transit time profile pattern and a predetermined distance defining a distance between the first second of the transit time profile pattern and the second section of the transit time profile pattern; and associate the location stored in the transit time profile memory in respect of the predetermined transit time profile pattern with the transit time profile when the first transit time profile section is found to match the first section of the transit time profile pattern and the second transit time profile section is found to match the second section of the transit time profile pattern and the distance is found to match the predetermined distance.

5. The animal surveillance device according to claim 1, wherein the electromagnetic radiation is laser radiation.

6. The animal surveillance device according to claim 1, further comprising a traversing device for moving the scanner within the animal housing facility in a traversing direction which is transverse to the scanning direction.

7. The animal surveillance device according to claim 1, wherein the evaluation unit is configured to record a transit time profile during continuous movement of the scanner along the animal housing facility, and wherein the animal housing facility has a plurality of distinct housing units separated from each other, and the evaluation unit is configured to record, in a single transit time profile, during traversing movement, the plurality of distinct housing units separated from each other and to compare the transit time profile with a transit time profile pattern stored for the plurality of distinct housing units separated from each other.

8. The animal surveillance device according to claim 6, wherein a neighboring scanner unit is arranged flush with the scanner unit in respect of the traversing direction and spaced a distance apart from it in the traversing direction, wherein:

the evaluation unit is configured to calculate a neighboring transit time signal from a reception of a signal emitted from the neighbouring scanner unit and its transit time;

the scanner unit and the neighboring scanner unit with the evaluation unit are configured and interconnected for simultaneous recording of a transit time profile from the transit time signal and of a neighboring transit time profile from the neighboring transit time signal; and the evaluation unit is configured to compare the transit time profile and the neighboring transit time profile with each other based at least in part on the spacing and a traversing speed, and to evaluate as sign-of-life signals any transit time signals for which no match can be found in the transit time profile and the neighboring transit time profile.

9. The animal surveillance device according to claim 8, wherein the neighboring scanner unit transmits and receives in a neighboring scanner which runs non-parallel to the scanner of the scanner unit and which lies in a level plane with the scanner and the traversing direction, wherein the neighboring scanner is oriented such that, a neighboring scanner radiation direction is at an angle to a scanner radiation direction, and wherein the evaluation unit is configured to compare the transit time profile and the neighboring transit time profile with each other on the basis of the transit time signal, the neighboring transit time signal, the spacing between the scanner unit and the neighboring scanner unit, and the angle between the scanner and the neighboring scanner based at least in part on the spacing and the traversing speed, and to evaluate as sign-of-life signals any transit time signals for which no match can be found in the transit time profile and the neighbouring transit time profile.

10. The animal surveillance device according to claim 1, wherein the electromagnetic radiation has a wavelength in a range which is not visible to a hen.

11. The animal surveillance device according to claim 1, wherein each scanner unit emits a one-dimensional electromagnetic beam with a constant angular orientation.

12. The animal surveillance device according to claim 1, wherein each scanner unit emits a pulsed electromagnetic beam.

13. The animal surveillance device according to claim 1, wherein a contactlessly measuring temperature sensor is arranged for temperature measurement along the scanning direction and adjacent to or coaxially with the scanner.

14. The animal surveillance device according to claim 13, wherein the temperature sensor is in signal communication with the evaluation unit, and the evaluation unit is configured to associate with one another a signal detected by the scanner and a signal detected simultaneously by the temperature sensor.

15. The animal surveillance device according to claim 1, wherein the evaluation unit is configured to calculate a position of the scanner along a traversing path and to associate that position with the transit time profile at least partially based on one or both of a regular time interval measured by a counting means or a regular spatial interval measured by the counting means between structures detected by the scanner.

16. The animal surveillance device according to claim 1, further comprising a sensor coupled to a transmission element driven by a drive unit or to a passively driven transmission element for measuring a distance travelled by the transmission element, wherein the evaluation unit is in signal communication with the sensor and is configured to determine, from a distance signal received from the sensor, a position of the scanner along a path of travel and to associate that position with the transit time profile.

17. An animal surveillance device for detecting stationary objects in a poultry house comprising a plurality of structures, the animal surveillance device further comprising:
- a noncontact scanner adapted to emit electromagnetic radiation and to receive a reflection of the electromagnetic radiation, the scanner including at least one scanner unit comprising a transmitter for transmitting an electromagnetic scanning beam in a predetermined direction and a receiver for receiving a reflection of the scanning beam from the predetermined direction, such that the scanner is adapted to move along a row of cages or housing units and produces and analyses a single transit time profile for the row of cages or housing units to determine a location precisely to localise an animal that has been identified;
- a traversing device for moving the scanner within the poultry house in a traversing direction which is transverse to the predetermined direction;
- a sensor coupled to the traversing device driven by a drive unit or to a passively driven traversing device for measuring a distance travelled by the traversing device; and
- an electronic evaluation unit in signal communication with the scanner and adapted to evaluate the signals received from the scanner;

wherein the evaluation unit is configured to:
- calculate a transit time signal from a reflected signal emitted from the scanner unit and from a transit time of the transit time signal and to produce a transit time profile for the scanner unit from the transit time signal received over a period;
- record, in a calibration mode, a first transit time profile and to store the first transit time profile as a transit time profile pattern in the transit time profile memory; and
- record, in a surveillance mode, a second transit time profile and then any further transit time profiles, and to compare the second transit time profile and each further transit time profile with the transit time profile pattern;

wherein the evaluation unit is in signal communication with the sensor and is configured to determine, from a distance signal received from the sensor, a position of the scanner along a path of travel and to associate that position with the transit time profile;

wherein the evaluation unit includes a counting means and is configured to store in the counting means a number of the plurality of structures detected at regular time intervals and/or at regular spatial intervals by the scanner; and wherein the evaluation unit is configured to determine the position of the scanner on the basis of the pattern of the transit time signals distributed in the transit time profile pattern.

* * * * *